(12) United States Patent
Choi

(10) Patent No.: US 8,991,384 B2
(45) Date of Patent: Mar. 31, 2015

(54) ROTARY BARBECUE DEVICE

(76) Inventor: Kwang-Ho Choi, Seoul (KR)

(*) Notice: Subject to any disclaimer, the term of this patent is extended or adjusted under 35 U.S.C. 154(b) by 716 days.

(21) Appl. No.: 13/248,152

(22) Filed: Sep. 29, 2011

(65) Prior Publication Data

US 2012/0080025 A1    Apr. 5, 2012

Related U.S. Application Data

(63) Continuation of application No. PCT/KR2010/001946, filed on Mar. 30, 2010.

(30) Foreign Application Priority Data

Mar. 30, 2009  (KR) .......................... 10-2009-0027054

(51) Int. Cl.
*A47J 37/04* (2006.01)
*F24C 15/16* (2006.01)

(52) U.S. Cl.
CPC .............. *A47J 37/042* (2013.01); *A47J 37/041* (2013.01); *F24C 15/164* (2013.01)
USPC ................ 126/25 AA; 126/25 A; 99/421 HH; 99/421 HV; 99/421 P

(58) Field of Classification Search
CPC ................ A47J 37/04–37/045; A47J 37/0704; A47J 37/0745; F24C 15/164
USPC ........... 126/25 AA, 25 A; 99/421 H, 421 HH, 99/421 HV
See application file for complete search history.

(56) References Cited

U.S. PATENT DOCUMENTS 4,892,032 A * 1/1990 Jerome .................... 99/421 HV
5,562,022 A * 10/1996 Schmid et al. .............. 99/421 H

FOREIGN PATENT DOCUMENTS

| KR | 20-1993-0007088 U | 4/1993 |
| KR | 20-1998-0016729 U | 6/1998 |
| KR | 10-2003-0019706 A | 3/2003 |
| KR | 10-2005-0110559 A | 11/2005 |
| KR | 10-2006-0097414 A | 9/2006 |

OTHER PUBLICATIONS

International Search Report for corresponding PCT/KR2010/001946 (2 pages).

* cited by examiner

*Primary Examiner* — Kenneth Rinehart
*Assistant Examiner* — David J Laux
(74) *Attorney, Agent, or Firm* — Kramer Amado, P.C.

(57) ABSTRACT

The present invention relates to a rotary barbecue device, which includes: a casing forming a body thereof and having an exhaust gas housing for collecting exhaust gas and an exhaust gas path connected to the exhaust gas housing to discharge the exhaust gas via an exhaust hole; a ceramic burner mounted at the upper side of the casing to radiate infrared rays towards the inside of the casing; two rotating discs; rotating members mounted to the corresponding rotation couplings of the two rotating discs; a driving unit connected to any one of the rotating discs to rotate one or more of the rotation couplings in the centers and the rotation couplings in the edges; and a moving unit connected to the rotating discs to move the rotating discs.

8 Claims, 8 Drawing Sheets

ROTARY BARBECUE DEVICE

CROSS REFERENCE TO RELATED APPLICATIONS

This application is a continuation of International Patent Application No. PCT/KR2010/001946, filed Mar. 30, 2010, entitled "Rotary Barbecue Device", which claims priority of Korean Patent Application No. 10-2009-0027054, filed Mar. 30, 2009, the entire disclosures of both of which we hereby incorporate by reference in their entirety.

BACKGROUND OF THE INVENTION

The present invention relates to a rotary barbecue device, and more specifically to a rotary barbecue device, wherein a completely combustible ceramic burner is used, the food is rotated to make rotation and revolution possible so that the food can periodically move close to the ceramic burner, the condition of the food approaching the ceramic burner rotates by 180 degrees per revolution of rotating discs, and the rotating plate can be removed from the casing.

DESCRIPTION OF THE RELATED ART

Barbecue cooking is one of traditional dishes that both the East and West have been enjoying since ancient times, and with the development of the human diet, cooking methods and cooking tools have been steadily developing.

The conventional barbecue device is using mainly an indirect heating method, whereby meat is heated to be roasted by a built-in electric heater, or meat is roasted by the heat generated from burning charcoal or firewood, or meat is roasted by raising the temperature inside the roasting space with gas flames.

An electric heating method using an indirect heat source is weak in calorific power, so it needs to be heated for a long time. Because of that, it has problems that the surface of meat is dried from time to time to make the quality of product inferior, that it requires high running costs because it uses electric energy of a high energy unit cost, and that the electric heating rod should be exchanged frequently because its life is short.

Further problems are that charcoal or firewood is not only unsanitary because it generates soot and smoke, and that the outside of meat is burned but the inside is not well cooked resulting in inferior quality. Moreover, due to the heating method by heat convection whereby the indoor temperature is raised with gas flames for heating, the heat efficiency is lower than direct heating and the whole indoor temperature is raised, and since meat is roasted by that temperature, the negative effects of an ordinary steamed dish are greater than that of a barbecue.

Furthermore, it is difficult to maintain the heating temperature consistently for meat; even though meat is roasted well by maintaining a certain temperature, meat is heated from the surface, so if you wait until the inside of meat is completely roasted, the surface becomes too dry. Not only that, the surface of the meat may be scorched or burnt in a severe case, so the problem is that the taste and quality are lowered by a great deal.

SUMMARY OF THE INVENTION

To overcome such problems, a ceramic burner is developed.

A ceramic burner includes a casing which is connected to a gas pipe to make gas diffuse uniformly, a barrier which blocks the gas supplied from the inside of the casing to help gas diffusion, and a cell-type base plate of ceramic material which is formed in the upper portion of the casing to uniformly discharge gas.

To describe in more detail, a preferable base plate member is molded in a honeycomb shape and made of ceramic material, which can maintain a very high temperature.

On the ceramic base plate are formed a plurality of adjoining long cells. A preferable density of cells may be in the range of 16 cells to 200 cells per square inch. A preferable thickness of the base plate may be in the range of about 6.35 to 25.4 mm.

Because the honeycomb-shaped base plate member can maintain a very high temperature, any fat matter dropping from the food being cooked evaporates on touching the cell-type base plate, so it can prevent flames from suddenly leaping up.

It was discovered that the shape of each cell could change, and rectangular, circular, triangular, hexagonal and octagonal cells are possible. Also, because the whole base plate member is heated when the grill is operated, heat is distributed uniformly to be transmitted to the food being cooked.

However, the above-mentioned ceramic burner is unable to make complete combustion, so unburned gases such as carbon monoxide are discharged. Because of this, it cannot reach the temperature that a ceramic burner can discharge if the ceramic burner makes complete combustion.

Therefore, the form of heat that a ceramic burner discharges toward the food includes not only radiation heat but also a considerable amount of convection heat. And flames appearing on the ceramic burner also generate convection heat instead of radiation heat.

As described above, a big reason for using charcoal most frequently as fuel for roasting is because it can improve the taste of food as heat is supplied to the inside of the food due to the discharge of far infrared rays, namely, convection heat.

However, if food is heated by radiation heat that is not sufficient in a ceramic burner as mentioned above and the convection heat by the temperature difference formed around the flames of a ceramic burner, the taste is inferior to that of the food cooked by charcoal and also the cooking time takes longer.

The conventional rotary barbecue device comprises a door installed on one side of a hollow-shaped barbecue device, a driving rotating plate which is installed in this barbecue device and rotated by a motor and power transmission means, a driven rotating plate which is connected to the center of the driving rotating plate by a rotary shaft, so as to be operated by each other, a rotating member which is fastened to a plurality of rotation axis couplings formed in the edge of the driving rotating plate and driven rotating plate and on which foods can be hung, a driving unit which can rotate the rotation axis couplings of the driving rotating plate, and a heat generation means which supplies heat for cooking.

In a barbecue device constructed as described above, a proper quantity of food to be cooked is installed in each rotating member, and after the rotating member is mounted on the rotary shaft couplings, the power switch is turned on, then the food is cooked by periodically approaching the heat generation means as the rotating disc and/or the rotating member are rotated.

If meat is put on one part of the rotating member, there is a problem that it cannot be roasted selectively.

But because the condition of the food when it approaches the heat generating means is not constant, there is a problem that a specific portion may be burnt or not cooked.

Also, when the rotary grill with cooking completed is exchanged in the conventional rotary barbecue device, there is a problem that the worker may be burnt on his hand or arm because he puts his arm into the cooking space of high temperature to exchange the rotary grill. Another problem is that it is not easy to check the cooked condition of the food in the rotary grill with the naked eye, and the worker may be burnt when applying condiments to the food to be cooked.

Accordingly, to solve the above problems, it is an object of the present invention to provide a rotary barbecue device wherein the food is rotated to make rotation and revolution possible so that the food can approach the ceramic burner periodically, the condition of the food approaching the ceramic burner rotates by 180 degrees per revolution of rotating discs, and the rotating plate can be removed from the casing to make it easy to exchange the rotary grill.

In order to accomplish the foregoing objects, according to an embodiment of the present invention, there is provided a rotary barbecue device comprising: a casing forming the body thereof, and having an exhaust gas housing for collecting exhaust gas and an exhaust gas path connected to the exhaust gas housing to discharge the exhaust gas via an exhaust gas outlet; a ceramic burner mounted at the upper side of the casing to radiate infrared rays toward the inside of the casing; a pair of rotating discs mounted in the casing through a rotary shaft at a predetermined interval, wherein each of the rotating discs has a center rotation coupling installed in the center of the disc and a plurality of outer rotation couplings installed in the edge of the disc corresponding each other; rotating members mounted on the corresponding outer rotation couplings of the pair of rotating discs; a driving unit operatively connected to any one of the rotating discs to rotate at least one of the center rotation coupling and outer rotation couplings; and a moving unit operatively coupled with the rotating discs to move it in a horizontal direction; and wherein the outer rotation couplings rotate by 180 degrees per rotation of the rotating discs so as to have a phase difference, wherein the rotation and revolution motions of the rotation couplings are independently carried out, and the rotating discs have linear motion.

In the present invention, the moving unit may include: a pair of fixed frames which are operatively coupled with the rotary shaft provided with the pair of rotating discs and have driven rack gears on the top and wheels on the bottom thereof; a driving shaft which has driving pinion gears corresponding to the driven rack gears and is rotatably mounted on the casing; and a driving motor installed on the driving shaft to rotate it.

The moving unit may includes a lifting unit operatively coupled with the rotating discs for moving them in a vertical direction, and a horizontal moving unit coupled to the lifting unit to move the lifting unit in the horizontal direction, and the horizontal moving unit may include: a frame having a horizontal moving-rack gear to slidably move on the floor of the casing; a horizontal moving-pinion gear meshed with the horizontal moving-rack gear; and a horizontal moving-motor installed on a supporting member fixed to the casing to rotate the horizontal moving-pinion gear, and wherein the lifting unit may include: a pair of lifting-rack gear in which both ends of the rotary shaft provided with the pair of rotating discs are rotatably mounted; a pair of lifting-pinion gear meshed with the pair of lifting-rack gear; and a pair of lifting-motors fixed to the frame to rotate the pair of lifting-pinion gears.

The driving unit operatively connected to any one of the pair of rotating discs may include: a driving shaft installed through the center rotation coupling of the rotating discs, wherein the driving shaft is rotatably mounted on any one of the pair of fixed frames; an outer bracket installed in each of outer rotation couplings in the edge of the rotating discs; a center bracket installed on the driving shaft so as to enwrap it and make sliding contact possible; a rotation-driving motor operatively connected to one end of the center bracket so as to rotate it; a revolving motor operatively connected to one end of the driving shaft so as to rotate it; and a chain which is wound surrounding the outer circumferences of all of the outer brackets for the rotation thereof, wherein the chain is also wound on the outer circumference of the center bracket.

The rotating member may be a rotary grill or rotary shaft formed in such a way that both ends of it can be fastened to the center rotation coupling.

The rotary grill may have one end of a pair of grills pivotally coupled so as to be folded, and at the free end of any one grill of the pair of grills may be formed a fastener that can enwrap and fix the free end of the other grill of the pair of grills.

The rotary shaft may further include forks formed to be able to make foods immovable.

Another embodiment of the present invention adopts a method whereby the rotary disk can be moved toward the user by one simple operation, for this purpose, there is provided a rotary barbecue device comprising: a casing forming the body thereof, and having an exhaust gas housing for collecting exhaust gas and an exhaust gas path connected to the exhaust gas housing to discharge the exhaust gas via an exhaust gas outlet; a ceramic burner mounted at the upper side of the casing to radiate infrared rays toward the inside of the casing; a pair of rotating discs mounted in the casing through a rotary shaft at a predetermined interval, wherein each of the rotating discs has a center rotation coupling installed in the center of the disc and a plurality of outer rotation couplings installed in the edge of the disc corresponding each other; rotating members mounted on the corresponding outer rotation couplings of the pair of rotating discs; a driving unit operatively connected to any one of the rotating discs to rotate at least one of the center rotation coupling and outer rotation couplings; and a moving unit operatively coupled with the rotating discs to move it in a horizontal direction; and wherein the outer rotation couplings rotate by 180 degrees per rotation of the rotating discs so as to have a phase difference, wherein the rotation and revolution motions of the rotation couplings are independently carried out, and the rotating discs have linear motion, and wherein the moving unit includes an inclined lifting unit operatively coupled with the rotary shaft provided with the rotating discs to move them in inclination in the front bottom and rear top directions of the rotary barbecue device.

The inclined lifting unit may include: a pair of shaft blocks in which both ends of the rotary shaft of the rotating disc are rotatably mounted respectively; an inclined slider which is slidably installed on a pair of inclined rails in inclination in the front bottom and rear top directions of the rotary barbecue device, and are formed as one with each of the shaft blocks; a conveying screw which is installed on the body frame in parallel with the inclined rails and is screw-joined with the inclined slider installed on the inclined rails; and an inclined driving unit operatively coupled with the inclined slider to rotate the conveying screw.

According to the rotary barbecue device of the present invention, it provides the following effects. Whereas in the conventional rotary roasting device the worker may get a burn on his hand or arm because he puts his arm into the cooking space of high temperature to exchange the rotary grill when the cooking is completed, the present invention includes a moving unit for moving the rotating disc from the casing, so that the worker can take out or exchange the rotary grill that has been removed from the casing without putting his hand into the cooking space, when the rotating plate is automatically moved from the inside to the outside of the casing as mentioned above. So it is possible to prevent the worker from injury.

Also, whereas conventionally it was not easy to check the roasted condition of the object to be cooked in the rotary grill with the naked eye, the present invention uses a moving unit to move the rotating plate outside of the casing, so that the worker can easily check the cooked condition of the meat.

Also, it further includes a ceramic burner, so that the food is cooked by a direct heating method of the ceramic burner in which large quantities of far infrared rays are generated through complete combustion. Therefore, the heat energy utilization efficiency is higher compared with the conventional ceramic burner, and the food is cooked while it is being directed from inside to outside by the action of far infrared rays. So the taste and quality are improved because the over-drying of the surface of meat is prevented.

Also, according to the present invention, meat is roasted uniformly and optimally on the whole by non-flame heat and radiation of abundant far infrared rays, and material harmful to the human body is removed so that you can have tastier and well-roasted meat, and it is not scorched or overdried after roasting is finished, so you can eat it more conveniently by allowing easy storage.

Also, by dint of the action of far infrared rays, loss of gravy can be minimized, and since foods are rotated continuously by the rotating disc, temperature is maintained uniform, so it is roasted uniformly without being partially burned or under cooked. And there is no oxidation phenomenon, in which the part in contact is burned and the rest is not fully cooked as on a hot grill.

Also, when the food approaches the ceramic burner, the direction of the food facing the ceramic burner is changed 180 degrees for every rotation of the rotating plate, so the action is just like turning it over by hand, ensuring the food is roasted more deliciously. Thus, dishes having a certain taste become possible regardless of the personal ability of the cook.

Also, since the food can be rotated and/or revolved freely, it is possible not only to uniformly cook all the foods on a plurality of rotary grills installed on the rotating disc but also to concentrate cooking on the food on any one of many rotary grills.

Namely, in the case of rotation and revolution, the meats on all the rotary grills installed on the rotating plate are cooked simultaneously; in the case of rotation only, the meat on one or a pair of rotary grills are made to approach the burner for more concentrated cooking.

Consequently, it is possible to concentrate on roasting the meat on one or a pair of rotary grills through rotation only when ordered by the guest, while roasting all the meats (preliminary roasting) of the rotary grill through rotation and revolution.

Also, the present invention makes high-class barbecue roasting possible as it does not generate smoke though it uses gas fuel indoors.

Also, the present invention makes it possible to have a succulent and tasty roast since it is roasted while fat is removed by the action of far infrared and a constant amount of moisture is maintained.

Also, in the present invention the bonding of water molecules on the protein surface of meat is released by radiation of a large quantity of far infrared rays, so the drip phenomenon, in which the surface is dried and discolored to become brown as the carbon atoms, which is the nucleus of protein, is removed together with the water molecules during protein decomposition, is suppressed. So the problem that meat is burned or dried excessively disappears even if it is heated for a long time.

Also, since the food is revolved while it is rotated and the food can be moved out of the casing, it is convenient for the cook to apply condiments; by using the center rotation coupling only, it is possible to cook a large-volume whole-pig barbecue.

Also, the rotary grill can be moved up and down, so if the meat was cooked too much or you want to delay cooking, you can move the grill away from the burner; if you want to cook fast, you can move the grill close to the burner.

BRIEF DESCRIPTION OF THE DRAWINGS

The above objects, features and advantages of the present invention will become more apparent to those skilled in the related art in conjunction with the accompanying drawings. In the drawings.

DETAILED DESCRIPTION OF THE INVENTION

Figure 1:
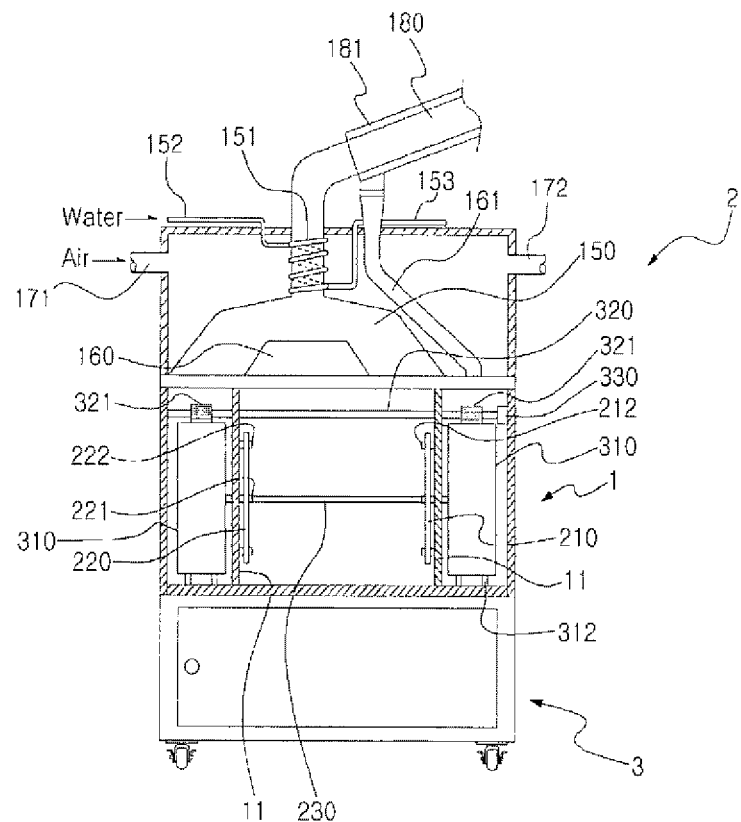
FIG. 1 is a schematic cross-sectional view of a rotary barbecue device according to a first embodiment of the present invention.

Hereinafter, preferred embodiments of the present invention will be provided to allow those skilled in the art to which the present invention pertains to more clearly understand and easily embody the present invention with reference to the accompanying drawings. However, a variety of modifications, variations and/or alterations of such embodiments of the present invention may be possible and the present invention is not particularly restricted to the following embodiments. For clarity, some components or parts irrelevant to technical configurations of the present invention will be omitted from the drawings, and like reference numerals denote elements having substantially the same configurations or performing similar functions and actions throughout the drawings.

Figure 2:
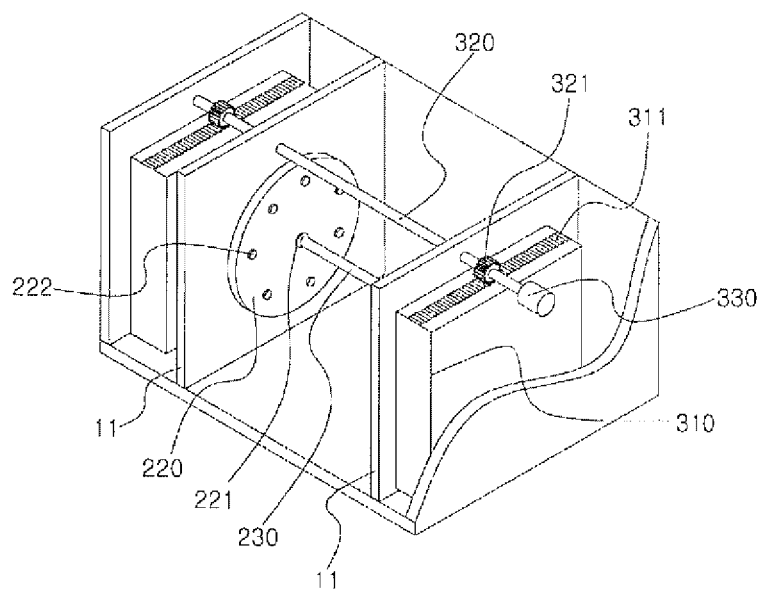
FIG. 2 is a schematic perspective view of a moving unit of FIG. 1.
Figure 3:
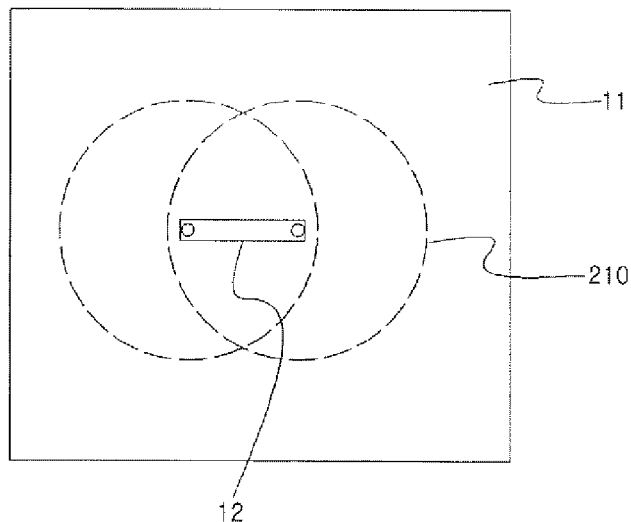
FIG. 3 is a side view of the cooking housing of FIG. 1.
Figure 4:
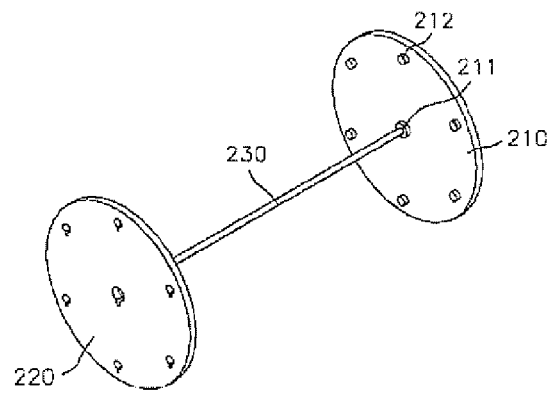
FIG. 4 is a perspective view showing a pair of rotating discs of FIG. 1.
Figure 5:
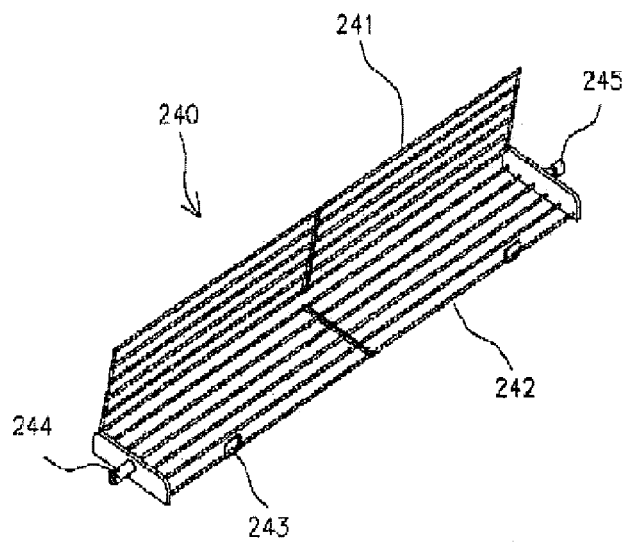
FIG. 5 is a perspective view showing an unfolded state of the rotary grill.
Figure 6:
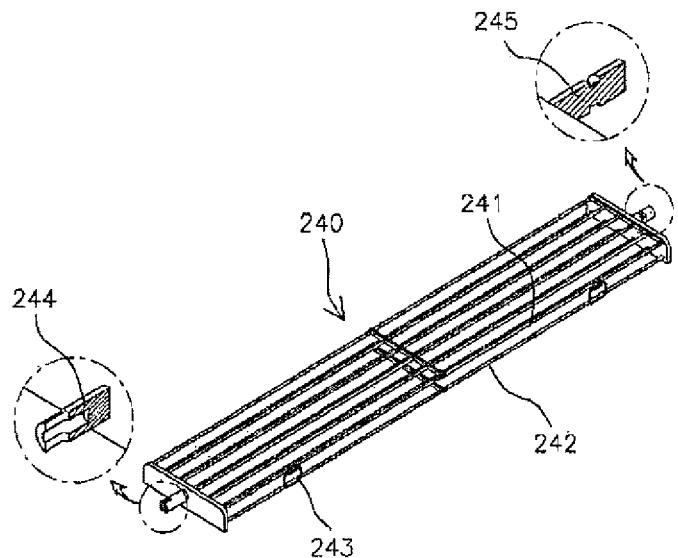
FIG. 6 is a perspective view showing a folded state of the rotary grill of FIG. 5.
Figure 7:
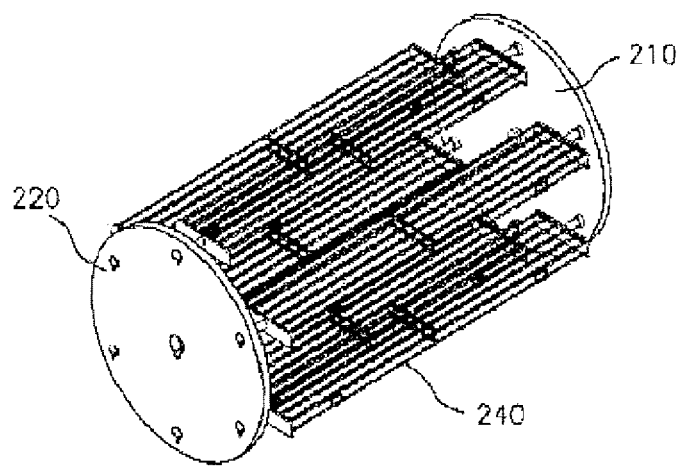
FIG. 7 is a perspective view showing a state in which the rotary grills in the folded state of FIG. 6 are inserted into the rotating discs of FIG. 4.
Figure 8:
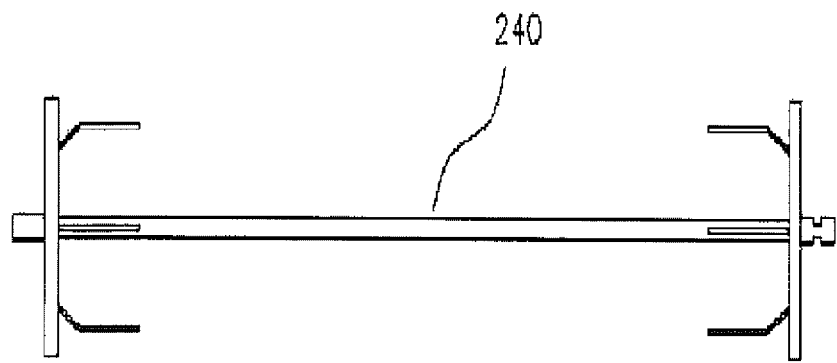
FIG. 8 is a front view of a rotary shaft having forks.
Figure 9:
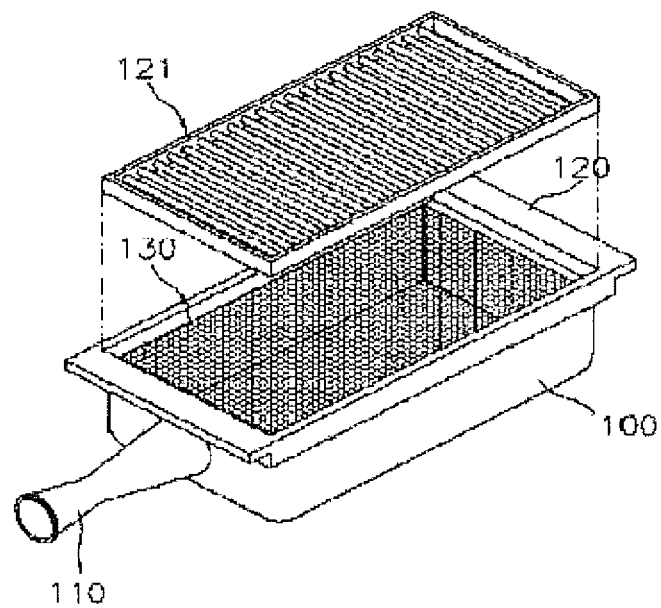
FIG. 9 is a separated perspective view of a ceramic burner having ceramic bars installed therein.
Figure 10:
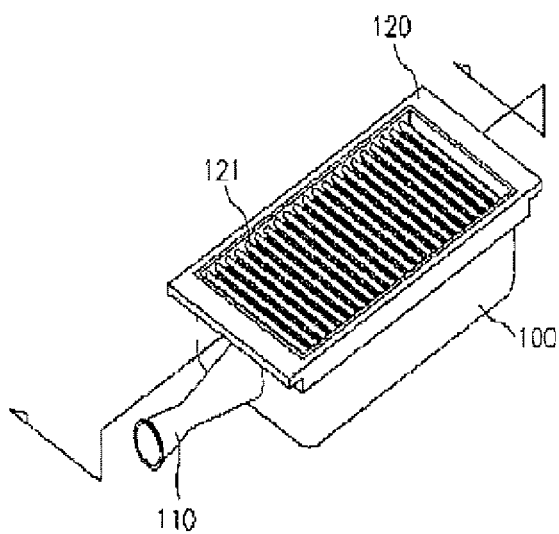
FIG. 10 is a perspective view showing a state having the ceramic burner of FIG. 9 joined.
Figure 11:
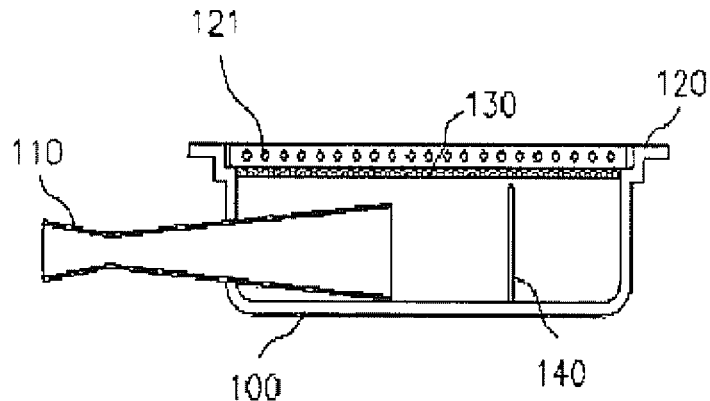
FIG. 11 is a sectional view of the ceramic burner of FIG. 10.
Figure 12:
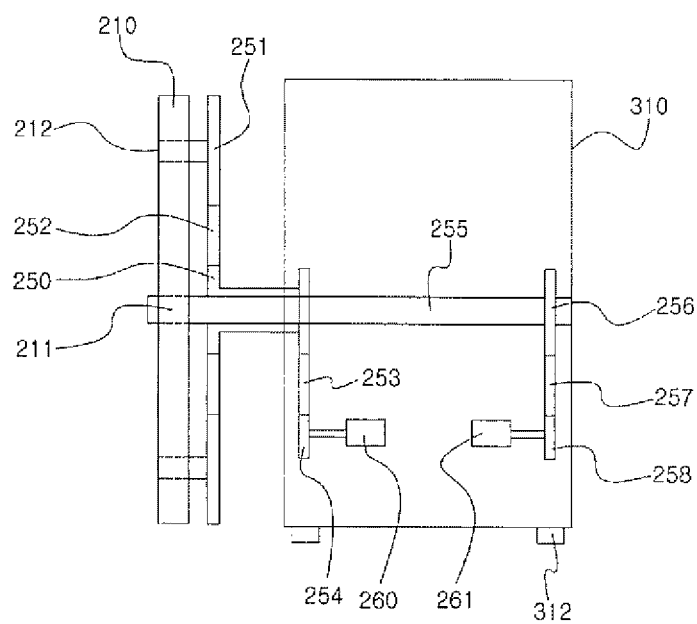
FIG. 12 is a schematic view showing the driving unit of an embodiment of the present invention.
Figure 13:
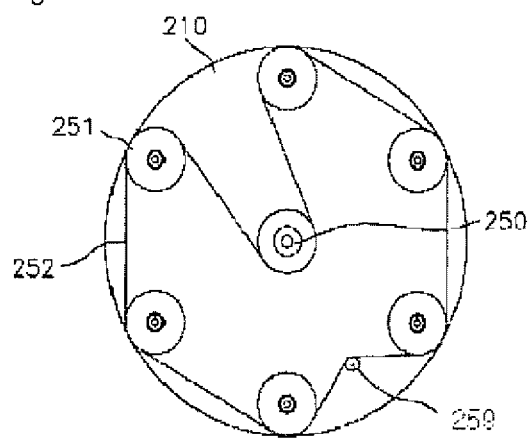
FIG. 13 is a plan view of the drive-side rotating disc of the present invention.
Figure 14:
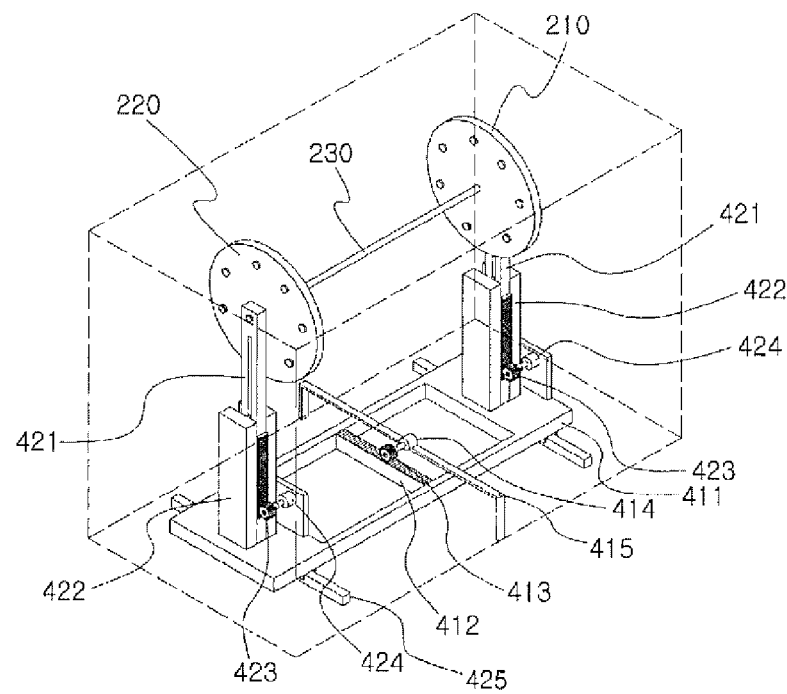
FIG. 14 is a perspective view illustrating a modified example of the moving unit according to the present invention.
Figure 15:
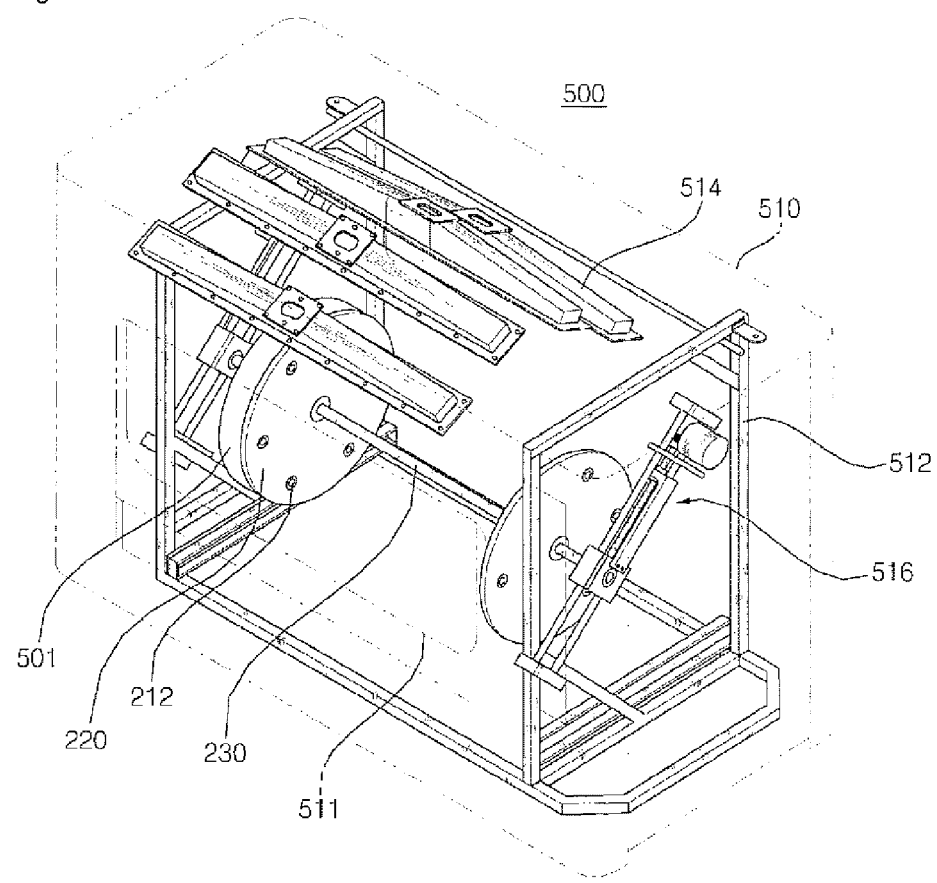
FIG. 15 is a schematic perspective view of a rotary barbecue device according to a second embodiment of the present invention for showing a state that rotating discs are arranged in the rear top side.
Figure 16:
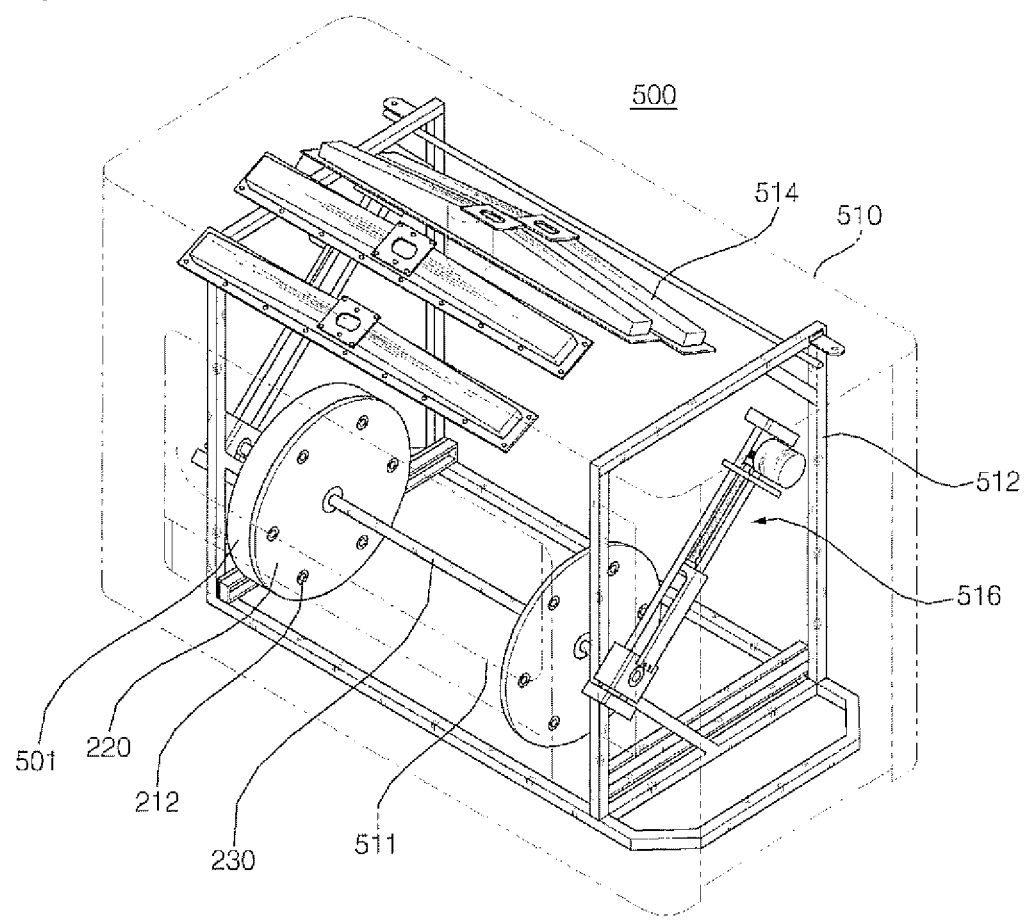
FIG. 16 is a schematic perspective view of a rotary barbecue device according to a second embodiment of the present invention for showing a state that rotating discs are arranged in the front bottom side.
Figure 17:
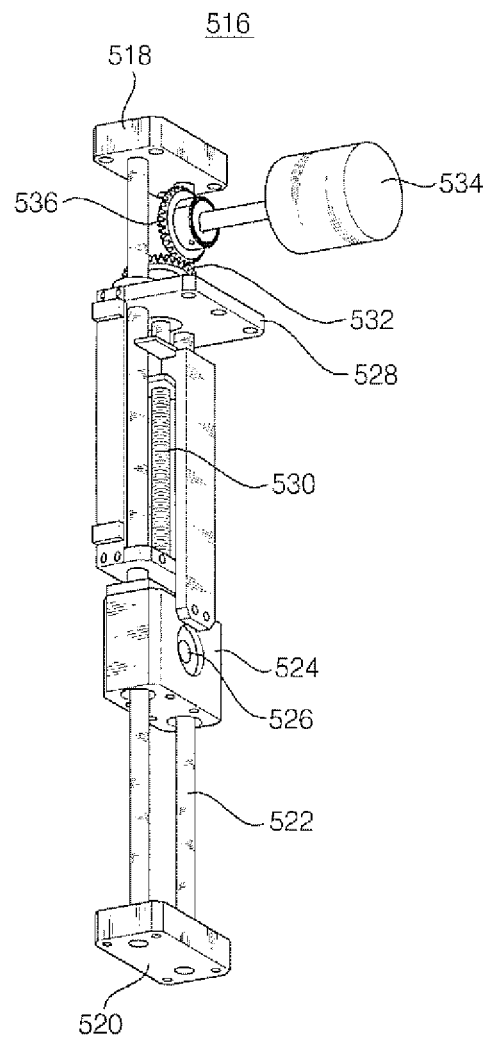
FIG. 17 is a perspective view of an inclined lifting unit used in the rotary barbecue device of FIG. 15.

FIG. 1 is a schematic cross-sectional view of a rotary barbecue device according to a first embodiment of the present invention; FIG. 2 is a schematic perspective view of a moving unit of FIG. 1; FIG. 3 is a side view of the cooking housing of FIG. 1; FIG. 4 is a perspective view showing a pair of rotating discs of FIG. 1; FIG. 5 is a perspective view showing an unfolded state of the rotary grill; FIG. 6 is a perspective view showing a folded state of the rotary grill of FIG. 5; FIG. 7 is a perspective view showing a state in which the rotary grills in the folded state of FIG. 6 are inserted into the rotating discs of FIG. 4; FIG. 8 is a front view of a rotary shaft having forks; FIG. 9 is a separated perspective view of a ceramic burner having ceramic bars installed therein; FIG. 10 is a perspective view showing a state having the ceramic burner of FIG. 9 joined; FIG. 11 is a sectional view of the ceramic burner of FIG. 10; FIG. 12 is a schematic view showing the driving unit of an embodiment of the present invention; FIG. 13 is a plan view of the drive-side rotating disc of the present invention; and FIG. 14 is a perspective view illustrating a modified example of the moving unit according to the present invention.

With reference to FIGS. 1 to 14, the rotary barbecue device of the present invention includes a casing, a ceramic burner, a pair of rotating discs 210 and 220, a rotating member, a driving unit and a moving unit. In this rotary barbecue device, outer rotation couplings 212 and 222 rotate by 180 degrees per rotation of the rotating discs 210 and 220 so as to have a phase difference. Here, the rotating discs 210 and 220 are characterized in that the rotation and revolution motions of the outer rotation couplings 212 and 222 are independently carried out.

The casing has a box shape in general, and it is preferable that it is formed in a two-layer structure of a cooking layer 1 for cooking foods using heat and a storage layer 3 for storage by heat insulation of cooked foods through the heat generated from the cooking layer 1.

The casing forms the body of the barbecue device, and has an exhaust gas housing for collecting exhaust gas and an exhaust gas path connected to the exhaust gas housing to discharge exhaust gas via an exhaust gas outlet.

Accordingly, in the storage layer 3 may be installed shelves for storing foods and a door through which the inside can be seen, and it is also possible to install an infrared lamp or an electric heating appliance to assist in the heat insulation role.

And it is preferable that the inside of the wall of the casing is made of heat insulating material that can block heat transfer and is highly resistant to heat, and a stainless steel plate, which is a commonly-used material, can be used for the exterior.

As shown in FIG. 1, a front door of a transparent material is installed in the front of the casing so as to watch the cooking process, and it is preferable that the material of the door is heat-resistant glass.

On the top of the casing is installed a ceramic burner, and on top of which there are an exhaust gas housing 150 for collecting exhaust gas generated by combustion of the ceramic burner and an exhaust gas path connected to the exhaust gas housing 150, and the collected exhaust gas is discharged via the exhaust gas outlet (not shown).

Around the exhaust gas path or the exhaust gas housing 150 is installed a heat exchange jacket 151. As the heat-exchange medium circulating in the heat exchange jacket is heat-exchanged with exhaust gas, a considerable part of the heat of exhaust gas can be recovered to be utilized.

As a heat-exchange medium, water may be used; it is introduced into a water inlet 152, and is discharged from the water outlet 153 through the heat exchange jacket 151.

In addition, a duct is arranged around the exhaust gas path or the exhaust gas housing 150. If air is blown into the duct through an intake port 171, air is heated by exhaust heat. At this time, by discharging hot air from the exhaust port 172, heat of exhaust gas can be recovered to be utilized.

As described above, by using hot water and hot air obtained through the recovered heat of exhaust gas, it is possible to heat the inside of the storage space or supply hot water.

Also, the exhaust gas path is made of a double structure of an inner tube 180 and an outer tube 181. It can be constructed in such a way that the inner tube 180 is connected to the exhaust gas housing 150 and the outer tube 181 is connected to a ventilation duct 160. The ventilation duct sucks in air from the atmosphere and supplies it to the ceramic burner.

Since the oxygen in the cooking space is not used through the exhaust gas path with a double structure as described above, it is possible to prevent the feeling of fatigue or headache caused by the lack of oxygen of the cooking person.

The ceramic burner mounted at the upper side of the casing radiates infrared rays toward the inside thereof.

As shown in FIGS. 9 to 11, a ceramic burner of a general type may be used for the ceramic burner. The ceramic burner includes a housing 100 which is connected to a gas tube 110 to make gas diffuse uniformly, a barrier 140 which blocks the gas supplied from the inside of the housing 100 to help gas diffusion, and a cell-type base plate 130 of ceramic material which uniformly discharges gas.

However, the conventional gas burner does not achieve complete combustion on the cell-type base plate 130 but instead forms convection heat. To solve this, it is preferable to install a plurality of ceramic bars 121 which are stacked on the cell-type base plate to help complete combustion of gas.

When installing ceramic bars 121, it is also possible to mount bars on the conventional ceramic burner using a frame 120.

Accordingly, gas makes primary combustion on the top side of the cell-type base plate 130, and the ceramic bars 121 installed in places 2 to 40 mm away from the top side of the cell-type base plate is heated by the heat from primary combustion. If the ceramic bars 121 reach high temperatures (e.g. 750° C. or higher), the incomplete combustion gas remaining is burned by the heat to thereby raise the combustion rate.

Therefore, the quantity of radiation heat of the ceramic burner is maximized by the ceramic bars 121 mounted on the base plate, fuel is saved, and the discharge of incomplete gas can be reduced.

Also, forming the ventilation duct 160 around the ceramic burner helps to solve the lack of indoor air due to complete combustion and use of outdoor air. Air in the atmosphere is introduced through the inner tube 180 of the exhaust gas path of with a double structure, and is supplied to the ceramic burner through the ventilation duct.

The ventilation duct 160 is connected to the inner tube 180 and an air supplying tube 161.

More than one ceramic burner may be arranged, and a plurality of them are arranged in such a way that the direction of radiation is crossed in one place.

It is possible to control the surface temperature of the ceramic burner by adjusting the quantity of gas supplied to the ceramic burner.

Further, a pair of rotating discs 210 and 220 having the same shapes are placed in the casing at a predetermined interval.

In the center of the rotating discs 210 and 220 are mounted center rotation couplings 211 and 221, and also in the edge thereof are mounted a plurality of outer rotation couplings 212 and 222 at a certain angle.

In the first embodiment of the present invention, six rotation couplings 212 and 222 are mounted in the edge of each of rotating discs 210 and 220, as shown in FIG. 4.

The center rotation coupling 211 and 221 is formed as one with the rotating discs 210 and 220, and the outer rotation couplings 212 and 222 in the edge are installed rotatably with respect to the rotating discs 210 and 220.

Between the region corresponding to couplings are installed both ends of the rotary grill 240 or a rotary shaft 246. Both ends of these rotary grill or axis are fastened by rotation couplings.

The rotary grill 240 may have various shapes. In the first embodiment of the present invention, one end of a pair of grills 241 and 242 is pivotally coupled, and at the free end of any one grill 214 or 212 of the pair of grills 241 and 242 is formed a fastener 243 that can enwrap and fix the other grill.

At both ends of the rotary grills 240 are formed rotation couplings 244 and 245 that can be connected to the outer rotation couplings 212 and 222.

Also, the shape of the rotary grill 240 may be designed in such a way that it can have a predetermined space inside according to the shape of the food inserted.

For example, in the case of a rotary grill for roasting fish, damage to the fish by the pressure of the rotary grill 240 can be prevented by making the shape of the inside space uniting a pair of grills have the shape of a fish.

And as shown in FIG. 8, by further providing both ends of the rotary shaft 246 with forks, the food to be grilled is fixed to the forks so as to be rotated together with the rotary shaft 246.

If the center rotation coupling 211 or the outer rotation coupling 212 in the edge in any one of the rotating disc 210 of rotating discs is rotated by the rotary grill 240 or the rotary shaft 246, the rotation force can also be transmitted to another rotating disc 220 as it is.

At this time, in order to rotate rotation couplings 211 and 212 mounted on the rotating disc 210, a driving unit operatively coupled with any one rotating disc 210 of the pair of rotating discs is provided.

It is convenient in terms of assembly to place the driving unit in any one of a pair of fixed frames 310 on the side of the rotating disc. In the first embodiment of the present invention, a driving unit employing brackets and chains is used as shown in FIGS. 12 and 13.

First, a driving shaft 255 is installed on the center rotation coupling 211 of the rotating disc 210 to be driven.

In one end portion of the driving shaft 255 is immovably installed a driving bracket 256. The driving bracket 256 is operatively connected by a chain 257 to a motor bracket 258 formed on a revolving driving motor 261 to transmit the driving force of a motor.

The driving shaft 255 is rotatably mounted on any one of the pair of fixed frames 310 through a bearing.

In addition, outer brackets 251 are installed as one with the outer rotation coupling 212 formed in the edge of the rotating disc 210, and in the center is installed a center bracket 250 which can be in sliding contact with the driving shaft 255.

One end of the center bracket 250 is extended lengthwise of the driving shaft 255 to form a driving bracket, and this driving bracket is connected to a motor bracket 254 formed on the rotation-driving motor 260 by a chain 253 to have the driving force of motor transmitted.

A chain 252 is wound surrounding the outer circumferences of all outer brackets 251, and the chain 252 is wound also around the center bracket 250 in the central portion.

Also, in order to provide tension to the chain circulating around the outer brackets 251 and the center bracket 250, an idle bracket 259 or idle pod (not shown) may be further provided.

In order for the outer rotation couplings 212 and 222 in the edge of rotating disc 210 and 2210 to be rotated by 180 degrees per rotation, the number of teeth of the center bracket 250 and outer brackets 251 are adjusted. The outer rotation couplings in the edge with a phase difference can provide an effect of continuously turning over below the ceramic burner located above.

The principle of operation of the driving unit is as follows.

If the revolution-driving motor 261 is actuated to rotate the driving shaft 255, the center rotation coupling 211 and rotating disc 210 that are formed as one with this are rotated together.

At this time, since the rotation-driving motor 260 is not actuated, it provides a self-locking effect to make the center bracket 250 maintain a fixed state by the rotation-driving motor.

Accordingly, the outer brackets 251 are connected with the center bracket 250 though the chain 252, so if the rotating disc 210 is rotated with the center bracket fixed, the outer brackets 251 are rotated at a certain velocity ratio by the chain 252 that rotates relative to the center bracket 250. Thusly, the rotation and revolution of the outer brackets 251 are obtained.

At this time, the directions of rotation of the center bracket 250 and outer brackets 251 are opposite each other.

On the other hand, if the rotation-driving motor 260 is actuated and the revolution-driving motor 261 is not actuated, the revolution-driving motor 261 provides the self-locking effect. Accordingly, the driving shaft 255 is maintained in a fixed state, and the rotating disc 210 that is joined as one with the shaft is also maintained in a fixed state.

And, if the center bracket 250 is rotated by the driving force of the rotation-driving motor, the outer bracket 251 is rotated via the chain. At this time, the outer bracket 251 only rotates in place without revolution.

At this time, the center bracket 250 comes into sliding contact with the driving shaft 255.

In addition, in the case of actuating both the rotation-driving motor 260 and revolution-driving motor 261 simultaneously, if the directions of rotation of both are the same, the outer bracket 251 does not rotate and only the center bracket 250 rotates. If the directions of rotation of both motors are opposite, the outer bracket 251 has an increasing rotation velocity, and the center bracket 250 is rotated according to the rotational speed provided by the revolution-driving motor 261.

Accordingly, seeing the rotation state of the device of the present invention according to the principle as described above, we can realize four aspects: rotation of the outer bracket 251 only, revolution of the center bracket 250 only, rotation and revolution of the center bracket 250 and outer bracket 251, and rotation and revolution of the center bracket 250 and outer bracket 251 having a fast velocity of rotation.

The moving unit is coupled with the rotary shaft 230 having the rotating discs 210 and 220 to move the disks 210 and 220 forward and backward.

As shown in FIG. 1 and FIG. 2, the moving unit includes a pair of fixed frames 310, a driving shaft 320 and a driving motor 330.

The pair of fixed frames 310 are connected to the pair of rotating discs 210 and 220, and a pair of driven rack gears 311 for moving the fixed frames are installed on the top and wheels 312 on the bottom.

The wheels 312 reduce friction with the bottom of the cooking layer 1 when the pair of fixed frames 310 are moved forward and backward to make them move more easily.

The pair of fixed frames 310 rotatably support both ends of the rotary shaft provided with the pair of rotating discs 210 and 220 through bearings.

The driving unit is joined to any one of the pair of fixed frames 310.

Fixed plates 11 may be installed between the pair of fixed frames 310 and the pair of rotating discs 210 and 220 to prevent movement to the left and right, when the pair of fixed frames 310 and the pair of rotating discs 210 and 220 are moved forward and backward.

At this time, it is preferable to form slots 12 on the fixed plates 11 to guide the movement of a pair of rotating discs 210 and 220 by the moving unit.

Both ends of the driving shaft 320 are rotatably mounted on the casing through bearings.

Also, if the fixed plates 11 are installed, the driving shaft 320 is rotatably mounted in a state passing through the fixed plates 11.

The driving shaft 320 has pinion gears 321 corresponding to the driven rack gears 311 meshed therewith.

The driving motor 330 is installed to rotate the driving shaft 320, and it is preferably fixed on the casing.

If the driving shaft 320 is rotated by the driving motor 330, a pair of fixed frames 310 are moved forward and backward by the relative motion of the driving pinion gears 321 and the driven rack gears 311, and eventually a pair of rotating discs 210 and 220 are moved forward and backward.

Accordingly, the rotating discs 210 and 220 are moved between the inside and outside of the casing by the moving unit.

When exchanging rotary grills that have finished cooking in a conventional rotary barbecue device, a worker sometimes burns his hand or arm because he must put his arm into the high-temperature cooking space to exchange the rotary grills. But if the rotating discs move automatically from the inside to the outside of the casing as described above, injury of the worker can be prevented because the worker can take out or exchange the rotating disc that has come out of the casing without his putting his hand into the cooking space.

Also, conventionally it was difficult to check with the naked eye the roasted condition of the object to be cooked in the rotary grill, but the worker can check the cooked extent of meat by moving the rotating disc out of the casing using the moving unit.

Also, as shown in FIG. 14, the moving unit may include a lifting unit operatively coupled with the rotating disc for lifting-it, and a horizontal moving unit operatively coupled with the lifting unit for moving it forward and backward.

The horizontal moving unit is provided with a frame 411, a horizontal moving-pinion gear 413, and a motor 414 connected to the horizontal moving-pinion gear on the frame.

The frame 411 is a member for supporting the lifting unit. Accordingly, it is preferable that it is made of steel material having certain strength.

And it is preferable that the size of the frame 411 is smaller than that of the casing so that it can be moved forward and backward in the casing in the installed state.

The frame 411 is provided with a horizontal moving-rack gear 412 meshed with the horizontal moving-pinion gear.

The position where the horizontal moving-rack gear 412 is positioned is not particularly limited but it is preferable that it is positioned at the central side of the frame 411 so as to maintain balance during the movement of the frame 411.

The horizontal moving-rack gear 412 is moved forward and backward by the horizontal moving-pinion gear 413 that is rotated by the driving force of the motor, eventually moving the frame 411 forward and backward with respect to the body of the device.

The frame 411 is sliding-moved on the floor of the casing. At this time, on the floor of the casing may be further installed rails 425 for guiding the frame 411.

When the horizontal moving-pinion gear 413 is rotated by the driving force of the motor, the horizontal moving-rack gear 412 meshed with the pinion gear is moved forward and backward.

The horizontal moving-motor 414 is fixed on the casing and provides driving force to rotate the horizontal moving-pinion gear 413.

Also, it is preferable to install in such a way that the horizontal moving-motor 414 is not obstructed during the movement of the frame 411. In the present first embodiment, a supporting member 415 is installed between the walls of the casing, and the horizontal moving-motor 414 is fixed to the supporting member 415, as shown in FIG. 14.

Namely, the supporting member 415 is installed higher than the frame 411, so the horizontal moving-motor 414 is not obstructed when the frame 411 is moved forward and backward.

The lifting unit includes a pair of lifting-rack gears 421, a pair of guide rails 422, a pair of lifting-pinion gears 423, and a pair of lifting-motors 424.

The rotating discs 210 and 220 are rotatably installed on the top end portions of the pair of lifting-rack gears 421.

It is preferable that the driving shaft 320 and the rotary shaft 230 provided with the rotating discs 210 and 220 are rotatably mounted on the top end portion of the pair of lifting-rack gears 421 through bearings (not shown), for example.

The pair of guide rails 422 are mounted with a bottom end portion fixed to the frame 411 so as to guide the lifting-of the rack gear 421.

The pair of lifting-pinion gears 423 correspond to the pair of lifting-rack gears 421, and transmit the rotation force of the motor to the rack gears.

A pair of lifting-motors 424 are connected to a pair of lifting-pinion gears to provide driving force.

The pair of lifting-motors 424 may be fixed to the frame 411 or the pair of guide rails 422.

Accordingly, if the horizontal moving unit and the lifting unit are provided, it is possible to adjust the distance between ceramic burner and grill by the rotating discs 210 and 220 moving between the inside and outside of the casing.

In the conventional rotary barbecue device, there were cases of the worker being burnt on his hand or arm because he put his arm into the high-temperature cooking space to exchange the rotary grills that have finished cooking. In the case of the present invention, the worker can take out or exchange the rotary grill that comes out of the casing without putting his hand into the cooking space, since the rotating disc moves automatically from the inside to the outside of the casing as described above, so injury of the worker can be prevented.

Also, since it is possible to adjust the temperature of the barbecue roast by adjusting the distance to the ceramic burner, it is possible to roast barbecue at optimum temperature suited to each object to be cooked.

Next, the second embodiment of the present invention will be described. The rotary barbecue device 500 of the second embodiment is to solve the problem of inconvenience that could occur when the rotary barbecue device of the first embodiment or the modified example is made up of moving forward and backward, or moving forward and backward and lifting and lowering. The inconvenience that could occur here is that if there is only forward and backward motion, the meat on the right is burned since it is too close to the heat source, or the device for solving this is too large. And, since the rotating disc comes close to the worker by moving forward and backward and lifting and lowering, the worker can work conveniently. But since it needs two mechanical actions, it has a problem that the machine becomes too complicated and it takes too long operation time.

To solve these problems, in the second embodiment, the rotating disc 210 is made to approach as low as the height of worker's hand in the rotary barbecue device. For this, an inclined lifting unit 516 capable of linear reciprocating motion in an inclined direction is installed between the front bottom where an opening 511 is located and the rear top where the heat source exists.

In the second embodiment, identical symbols are used for the components that are the same with the first embodiment and the description is omitted. The driving unit 501 in the second embodiment is identical to the driving unit of the first embodiment and is installed only on the left side.

The rotary barbecue device 500 is provided with a body frame 512 installed in the body 510 of the device and heaters 514 which are mounted in the inside upper portion of the body frame 512 and uses gas or electricity as an energy source, and below the heaters 514 are placed a pair of rotating discs 220 in a state fixed to both ends of the rotary shaft 230. And the rotary shaft 230, which is rotatably mounted on the inclined lifting unit 516, makes a linear reciprocating motion by the inclined lifting unit 516 in the inclined direction between the rear top and the front bottom.

The inclined lifting unit 516 includes a pair of shaft blocks 524 in which both ends of the rotary shaft 230 of the rotating disc 220 are rotatably mounted, a pair of inclined rails 522 which are installed in inclination in the directions of the front bottom and rear top of the rotary barbecue device 500, an inclined slider 528 which is formed as one with each shaft block 524 and is mounted slidably along the inclined rail 522, a conveying screw 530 which is mounted in the body frame in parallel with one of inclined rails 522 and is screw-joined with the inclined slider 528 mounted in the inclined rails 522, and an inclined driving unit for rotating the conveying screw 530.

The shaft block 524 has a shaft bearing 526 inserted and fixed inside, and the rotary shaft 230 is rotatably mounted to the shaft block 524 through the shaft bearing 526.

The shaft block 524 is fixed as one with the inclined slider 528. It is also possible to form a shaft block 524 as a part of the inclined slider 528. In the inclined slider 528 is formed a screw joint not shown, which is screwed with a conveying screw 530.

Both ends of the conveying screw 530 are rotatably mounted on the body frame 512 through bearings, and the slider 528 can be moved linearly along the inclined rails 522 by the rotation of the conveying screw 530.

And, a driving unit is installed at one end of the conveying screw 530 to rotate the conveying screw 530 normally or reversely. The driving unit is provided with a driven bevel gear 532 fixed to one end of the conveying screw 530, a driving bevel gear 536 meshed with the driven bevel gear 532, and an inclined driving motor 534 for rotating the driving bevel gear 536 through the motor axis.

In the second embodiment, installation space of components is saved by transmitting power at a right angle using the driving bevel gear 536 and driven bevel gear 532.

Through the construction as described above, it is possible to roast meat with the rotating discs 220 placed close to the heater 514. If necessary, it is possible to move the rotating discs 220 to the front bottom, which is farther away from the heater 514, so as to prevent burns and avoid meat burning, while coming close to where a worker's hand is by operating the inclined driving motor 534. And the rotating discs 220 can be made to get close to the heater 514 by operating the inclined driving motor 534 again after worker's work is completed.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

DESCRIPTION OF REFERENCE NUMERALS IN DRAWINGS

1: Cooking layer, 2: Exhaust portion
3: Storage layer, 11: Fixed plate
12: Slot, 100: Housing
110: Gas tube, 120: Frame
121: Ceramic bar, 130: Cell-type base plate
140: Barrier, 150: Exhaust gas housing
151: Heat exchange jacket, 152: Water inlet
153: Water outlet, 160: Ventilation duct
161: Air supplying tube, 171: Intake port
172: Exhaust port, 180: Inner tube
181: Outer tube, 210: Rotating disc
211, 221: Center rotation coupling, 212, 222: Outer rotation coupling
220: Rotating disc, 230: Rotary shaft
240: Rotary grill, 241: Grill
242: Grill, 243: Fastener
244: Rotation coupling, 245: Rotation coupling
246: Rotary shaft, 250: Center bracket
251: Outer bracket, 252: Chain
253: Chain, 254: Motor bracket
255: Driving shaft, 256: Driving bracket
257: Chain, 258: Motor bracket
259: Idle bracket, 260: Rotation-driving motor
261: Revolution-driving motor, 310: Frame
311: Driven rack gear, 312: Wheel
320: Driving shaft, 321: Pinion gear
330: Driving motor, 411: Frame
412: Horizontal moving-rack gear, 413: Horizontal moving-pinion gear
414: Horizontal moving-motor, 415: Supporting member
421: Lifting-rack gear, 422: Guide rail
423: Lifting-pinion gear, 424: Lifting-motor
425: Rail, 500: Rotary barbecue device
501: Driving unit, 510: Body
511: Opening, 512: Body frame
514: Heater, 516: Inclined lifting unit
522: Inclined rail, 524: Shaft block
526: Shaft bearing, 528: Inclined slider
530: Conveying screw, 532: Driven bevel gear
534: Inclined driving motor, 536: Driving bevel gear

What is claimed is:

1. A rotary barbecue device comprising:
a casing forming the body thereof, and having an exhaust gas housing for collecting exhaust gas and an exhaust gas path connected to the exhaust gas housing to discharge the exhaust gas via an exhaust gas outlet;
a ceramic burner mounted at the upper side of the casing to radiate infrared rays toward the inside of the casing;
a pair of rotating discs mounted in the casing through a rotary shaft at a predetermined interval, wherein each of the rotating discs has a center rotation coupling installed in the center of the disc and a plurality of outer rotation couplings installed in the edge of the disc corresponding each other;
rotating members mounted on the corresponding outer rotation couplings of the pair of rotating discs;
a driving unit operatively connected to any one of the rotating discs to rotate at least one of the center rotation coupling and outer rotation couplings; and
a moving unit operatively coupled with the rotating discs to move it in a horizontal direction; and
wherein the outer rotation couplings rotate by 180 degrees per rotation of the rotating discs so as to have a phase difference,
wherein the rotation and revolution motions of the rotation couplings are independently carried out, and the rotating discs have linear motion, and
wherein the moving unit includes: a lifting unit operatively coupled with the rotating discs for moving them in a vertical direction, and a horizontal moving unit coupled to the lifting unit to move the lifting unit in the horizontal direction.

2. A rotary barbecue device comprising:
a casing forming the body thereof, and having an exhaust gas housing for collecting exhaust gas and an exhaust gas path connected to the exhaust gas housing to discharge the exhaust gas via an exhaust gas outlet;
a ceramic burner mounted at the upper side of the casing to radiate infrared rays toward the inside of the casing;
a pair of rotating discs mounted in the casing through a rotary shaft at a predetermined interval, wherein each of the rotating discs has a center rotation coupling installed in the center of the disc and a plurality of outer rotation couplings installed in the edge of the disc corresponding each other;
rotating members mounted on the corresponding outer rotation couplings of the pair of rotating discs;
a first motor assembly operatively connected to any one of the rotating discs to rotate at least one of the center rotation coupling and outer rotation couplings; and
a second motor assembly operatively coupled with the rotating discs to move it in a horizontal direction; and
wherein the outer rotation couplings rotate by 180 degrees per rotation of the rotating discs so as to have a phase difference,
wherein the rotation and revolution motions of the rotation couplings are independently carried out, and the rotating discs have linear motion, and
wherein the second motor assembly includes: a vertical motor assembly operatively coupled with the rotating discs for moving them in a vertical direction, and a horizontal motor assembly coupled to the vertical motor assembly to move the vertical motor assembly in the horizontal direction.

3. The rotary barbecue device according to claim 2, wherein the horizontal motor assembly unit includes:
a frame having a horizontal moving-rack gear to slidably move on the floor of the casing;
a horizontal moving-pinion gear meshed with the horizontal moving-rack gear; and
a horizontal moving-motor installed on a supporting member fixed to the casing to rotate the horizontal moving-pinion gear, and
wherein the vertical motor assembly includes:
a pair of lifting-rack gear in which both ends of the rotary shaft provided with the pair of rotating discs are rotatably mounted;
a pair of lifting-pinion gear meshed with the pair of lifting-rack gear; and
a pair of lifting-motors fixed to the frame to rotate the pair of lifting-pinion gears.

4. The rotary barbecue device according to claim 2, wherein the second motor assembly includes:
a pair of fixed frames which are operatively coupled with the rotary shaft provided with the pair of rotating discs and have driven rack gears on the top and wheels on the bottom thereof;
a driving shaft which has driving pinion gears corresponding to the driven rack gears and is rotatably mounted on the casing; and
a driving motor installed on the driving shaft to rotate it.

5. The rotary barbecue device according to claim 4, wherein the first motor assembly operatively connected to any one of the pair of rotating discs includes: a driving shaft installed through the center rotation coupling of the rotating discs, wherein the driving shaft is rotatably mounted on any one of the pair of fixed frames; an outer bracket installed in each of outer rotation couplings in the edge of the rotating discs; a center bracket installed on the driving shaft so as to enwrap it and make sliding contact possible; a rotation-driving motor operatively connected to one end of the center bracket so as to rotate it; a revolving motor operatively connected to one end of the driving shaft so as to rotate it; and a chain which is wound surrounding the outer circumferences of all of the outer brackets for the rotation thereof, wherein the chain is also wound on the outer circumference of the center bracket.

6. The rotary barbecue device according to claim 4, wherein the rotating member is a rotary grill or rotary shaft formed in such a way that both ends of it can be fastened to the center rotation coupling.

7. The rotary barbecue device according to claim 6, wherein the rotary grill has one end of a pair of grills pivotally coupled so as to be folded, and at the free end of any one grill of the pair of grills is formed a fastener that can enwrap and fix the free end of the other grill of the pair of grills.

8. The rotary barbecue device according to claim 6, wherein the rotary shaft further includes forks formed to be able to make foods immovable.

* * * * *